(12) United States Patent
Smilovici et al.

(10) Patent No.: US 7,419,338 B2
(45) Date of Patent: *Sep. 2, 2008

(54) CUTTING INSERT HAVING CYLINDRICALLY SHAPED SIDE SURFACE PORTIONS

(75) Inventors: Carol Smilovici, Nahariya (IL); Assaf Ballas, Akko (IL)

(73) Assignee: Iscar Ltd., Tefen (IL)

( * ) Notice: Subject to any disclaimer, the term of this patent is extended or adjusted under 35 U.S.C. 154(b) by 60 days.

This patent is subject to a terminal disclaimer.

(21) Appl. No.: 11/751,888

(22) Filed: May 22, 2007

(65) Prior Publication Data

US 2007/0224006 A1   Sep. 27, 2007

Related U.S. Application Data

(63) Continuation of application No. 11/425,547, filed on Jun. 21, 2006, now Pat. No. 7,232,279.

(51) Int. Cl.
   *B23B 27/16*   (2006.01)
   *B23B 1/00*    (2006.01)
(52) U.S. Cl. ..................... 407/113; 407/115
(58) Field of Classification Search ......... 407/113–116, 407/103, 101, 67
   See application file for complete search history.

(56) References Cited

U.S. PATENT DOCUMENTS

| | | | |
|---|---|---|---|
| 3,487,515 A * | 1/1970 | Contrucci | 407/114 |
| 5,032,049 A * | 7/1991 | Hessman et al. | 407/113 |
| 5,230,591 A * | 7/1993 | Katbi et al. | 407/114 |
| D426,245 S * | 6/2000 | Bernadic et al. | D15/139 |
| 6,196,771 B1 * | 3/2001 | Andersson | 407/113 |
| 6,764,254 B2 | 7/2004 | Emoto et al. | |
| 6,902,354 B2 | 6/2005 | Satran | |
| 6,929,428 B1 | 8/2005 | Wermeister et al. | |
| 6,942,434 B2 | 9/2005 | Friedman et al. | |
| 7,104,735 B2 | 9/2006 | Johnson et al. | |

FOREIGN PATENT DOCUMENTS

WO   WO 03051566 A1   6/2003
WO   WO 2005/115667 A1   12/2005

OTHER PUBLICATIONS

International Search Report, PCT/IL2006/000662, dated Sep. 25, 2006.

* cited by examiner

*Primary Examiner*—Willmon Fridie
(74) *Attorney, Agent, or Firm*—Womble Carlyle (57) ABSTRACT

A double-sided reversible and indexable cutting insert has identical opposing first and second end faces and a peripheral side surface extending therebetween. A clamping through-bore extends between, and opens out to, the first and second end faces. The cutting insert has a median plane between the first and second end faces, and a through-bore axis extending perpendicularly through the median plane. The cutting insert also has a Y-fold rotational symmetry about the through-bore axis. The peripheral side surface has Y major side surfaces and Y minor side surfaces, each minor side surface interconnecting two adjacent major side surfaces. Each minor side surface is a section of a single cylindrical surface having a given radius, the given radius being greater than a minor side surface distance of each minor side surface from the through-bore axis.

23 Claims, 7 Drawing Sheets

CUTTING INSERT HAVING CYLINDRICALLY SHAPED SIDE SURFACE PORTIONS

This is a Continuation of U.S. patent application Ser. No. 11/425,547, filed Jun. 21, 2006, now U.S. Pat. No. 7,232,279. The contents of the parent application are incorporated by reference in their entirety.

FIELD OF THE INVENTION

The present invention relates to a double-sided, indexable and reversible cutting insert for metal cutting operations, in general, and for 45° shoulder face-milling operations, in particular.

BACKGROUND OF THE INVENTION

Such cutting inserts are generally provided with curved corners. U.S. Pat. No. 6,196,771 discloses a cutting insert having first and second side faces. Each side face includes a pair of minor cutting edges at each corner of the insert. The two minor cutting edges are located on two opposing sides of a corner bisector B, together forming an obtuse inner angle of about 170°, and are mirror-imaged about the bisector B. Two major cutting edges intersect respective ones of the minor cutting edges whereby each major cutting edge and its associated minor cutting edge together form a cooperating pair of cutting edges. There are two such cooperating pairs at each corner of each side face, whereby the insert has at least sixteen cooperating pairs. During a milling operation the insert is oriented so that only one cutting corner engages a work-piece, and only one of the cooperating pairs of cutting edges of that cutting corner is operative. Only half of the major cutting edge of each cooperating pair is effective. The minor cutting edge of the operative cooperating pair of cutting edges constitutes a wiper edge, by being arranged parallel to the surface of the work-piece, that is perpendicularly to an axis of rotation of a milling tool in which the cutting insert is mounted.

A drawback of these known inserts is that the minor cutting edge of each cooperating pair has a constant setting angle during the machining of the work-piece. Positioning deviation of the cutting insert relative to a cutter body of a milling cutter in which the cutting inserts are mounted, or axial bending of the milling cutter (which may occur under demanding machining conditions) may result in either a wiper corner adjacent the main cutting edge, or a wiper corner distal the main cutting edge of the cooperating pair cutting into the work-piece face, and thereby marring the face of a work-piece being milled.

U.S. Pat. No. 5,032,049 discloses an indexable cutting insert for face milling of engine blocks of cast iron. The insert has two opposing, substantially identical, generally square-shaped upper and lower surfaces which are perpendicularly connected by four side surfaces. Two adjacent side surfaces connect to each other via a smoothly rounded corner. The radius of the corner R is ¼ to ⅛ of a length X of the insert, and therefore the setting angle gets close to zero degrees during machining of the engine block when the insert gets close to the border line of the work piece. The corner of the cutting insert serves in machining the shoulder of a work-piece, as well as in finishing the face of the work-piece during the last pass of the milling cutter.

It is an object of the present invention to provide an improved cutting insert. This object is attained with the subject matter in accordance with the claims.

SUMMARY OF THE INVENTION

In accordance with the present invention there is provided a double-sided reversible and indexable cutting insert comprising identical opposing first and second end faces and a peripheral side surface extending therebetween. The cutting insert has a median plane extending between the first and second end faces, the median plane containing an insert center. An insert axis extends perpendicularly through the median plane and passes through the insert center. The peripheral side surface comprises Y major side surfaces and Y minor side surfaces, each minor side surfaces interconnecting two adjacent major side surfaces. Each minor side surface is a section of a single cylindrical surface having a given radius; the given radius is greater than a minor side surface distance of each minor side surface from the insert axis.

Preferably, each minor side surface has an associated minor surface axis extending parallel to the insert axis.

Further preferably, in an end view of the cutting insert, the minor side surface subtends a minor central angle of less than 15°.

Yet further preferably, the minor central angle is less than 5°.

Generally, the peripheral side surface meets the first and second end faces each at a continuous peripheral edge. Each peripheral edge comprises Y major edges and Y minor edges. Each major edge is formed at an intersection of an associated major side surface and a respective one of the first and second end faces. Each minor edge is formed at an intersection of an associated minor side surface and a respective one of the first and second end faces, and interconnects two adjacent major edges.

If desired, each minor edge extends between a raised corner, formed at a meeting of the minor edge with a preceding major edge, and a lowered corner, formed at a meeting of the minor edge with a following major edge. The raised corner is disposed farther from the median plane M than the lowered corner.

If further desired, the insert axis and the minor side surface axis define a bisector plane bisecting the minor side surface. The bisector plane and the median plane define a minor axis about which the minor side surface has 180° rotational symmetry.

Generally, two adjacent major median lines formed at intersections of the median plane with each of two adjacent major side surfaces, respectively, meet at an apex located on the minor axis of the minor side surface interconnecting the two adjacent major side surfaces.

Typically, the median plane intersects each minor side surface at a minor median line.

Preferably, each major median line is a straight line.

Further preferably, the minor axis bisects an internal major angle defined by the two adjacent major median lines.

If desired, each major side surface comprises a median surface extending transversely away from a major median line formed at an intersection of the median plane with the major surface, towards the first and second major edges.

If further desired, each major side surfaces comprises first and second support surfaces extending from the median surface towards the respective one of the first and second end faces.

If yet further desired, each major side surfaces comprises first and second primary relief surface extending transversely the major edge adjacent the respective one of the first and second end faces towards the support surface.

Preferably, the first and second support surfaces form each an acute internal support angle with the median plane, the first and second relief surface form each an acute internal relief angle with the median plane, and the internal support angle is equal to, or greater than, the internal relief angle.

Further preferably, the internal relief angle is largest adjacent the lower corner and smallest adjacent the raised corner of the major edge.

Generally, the minor side surface is perpendicular to the median plane.

If desired, in a major side view of the cutting insert, a major side line parallel to the major median line and passing through the lowered corner is longer than the major median line.

If further desired, in a minor side view of the cutting insert, a minor side line parallel to the minor median line and passing through the lowered corner is shorter than the minor median line.

Also, a clamping through-bore may extend between, and open out to, the first and second end faces, the insert axis serving as a through bore axis.

Furthermore, the cutting insert may have Y-fold rotational symmetry about the insert axis.

The present invention provides the following preferred advantages:

Because the entire length of each minor edge constitutes a wiper edge, positional deviation of the cutting insert in the insert pocket may not lead to reduced cutting performances, so that the wiper edge may be able to continue machining the work-piece face, substantially without compromising the smoothness of the work-piece face and to the quality of the finished product;

Peripheral surfaces of cutting inserts are often ground to reduce positioning deviation and to achieve a high quality finished product; however, the cutting insert of the present invention is capable of reducing the effects of positional deviation without necessitating grinding of the peripheral side surface.

BRIEF DESCRIPTION OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 1:
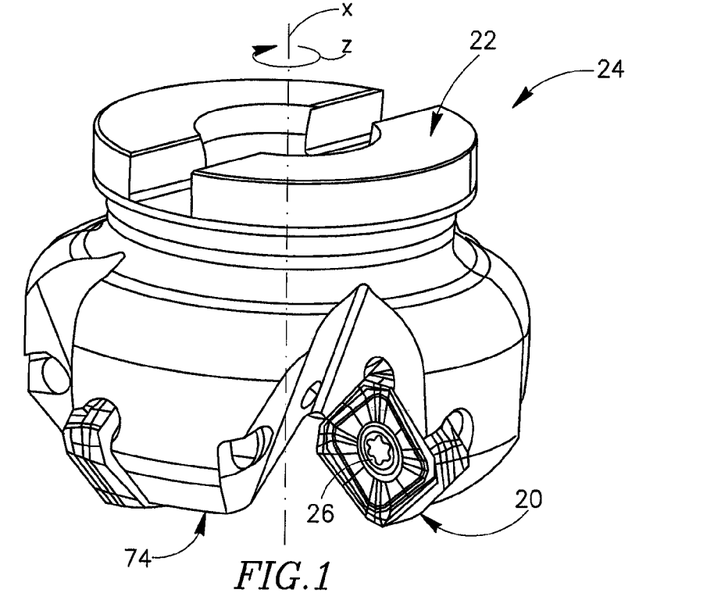
FIG. 1 shows a perspective view of a milling cutter having a cutting insert in accordance with the present invention mounted therein.
Figure 2:
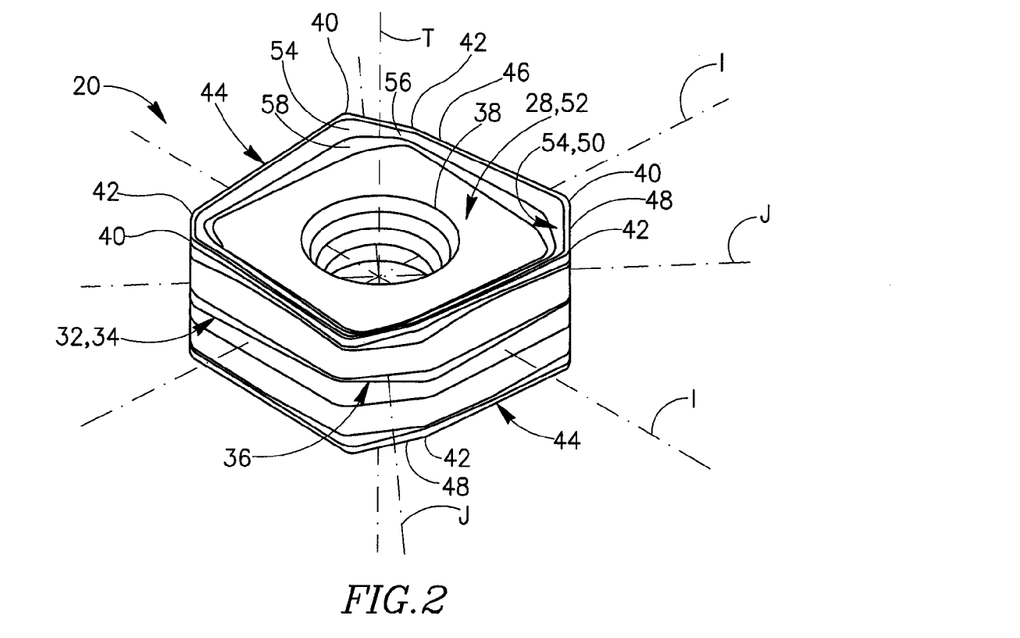
FIG. 2 shows a perspective view of the cutting insert shown in FIG. 1.

Attention is first drawn to FIG. 1. A cutting insert 20 in accordance with the present invention is secured to a cutter body 22 of a rotary milling cutter 24 by a clamping screw 26. The cutting insert 20 is of a double-sided, indexable and reversible type, and is generally adapted to perform face- and 45° shoulder-milling a work-piece (not shown).

Attention is now drawn to FIGS. 2 to 5. The cutting insert 20 has identical and opposing first and second end faces 28, 30. In an end view of the cutting insert 20, best shown in FIG. 3, each of the identical first and second end faces 28, 30 is of a general form of a square having curved corners. A peripheral side surface 32 extends between the opposing first and second end faces 28, 30. The cutting insert is of a negative type and therefore the peripheral side surface 32 is generally perpendicular to both end faces 28, 30. The peripheral side surface 32 has four identical major side surfaces 34 of a generally parallelogrammatic shape, and four identical minor side surfaces 36, also of a general parallelogrammatic shape. Each minor side surface 36 interconnects two adjacent major side surfaces 34.

A given major side surface 34 has 180° rotational symmetry about given major axis I associated therewith and extending generally perpendicularly therethrough. Similarly, a given minor side surfaces 36 has 180° rotational symmetry about given minor axis J associated therewith and passing generally perpendicularly therethrough. The major and minor axes I, J are co-planar and intersect at an insert center C to define an insert median plane M. A given major axis I defines an axis angle $\alpha$ of 45° with a given minor axes J.

The cutting insert 20 is provided with a clamping through-bore 38 extending between, and opening out to, the first and second end faces 28, 30. The clamping through-bore 38 is adapted for receiving the clamping screw 26. The clamping through-bore 38 has a through-bore axis T extending perpendicularly to the median plane M through the insert center C, so that the first and second end faces 28, 30 each have 90° rotational symmetry about the through-bore axis T.

The first and second end faces 28, 30 have each four raised corners 40 and four lowered corners 42. The raised corners 40 of each of the first and second end faces 28, 30 lie in a first and second end planes $E_F$, $E_S$, respectively. The median plane M is parallel to, and lies midway between, the first and second end planes $E_F$, $E_S$. The lowered corners 42 are closer to the median plane M than the raised corners 40.

Figure 4:
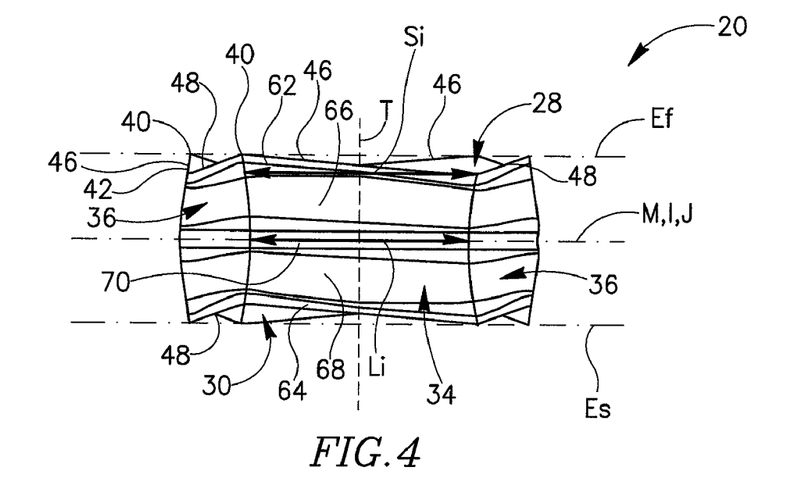
FIG. 4 shows a major side view of the cutting insert shown in FIG. 2.
Figure 5:
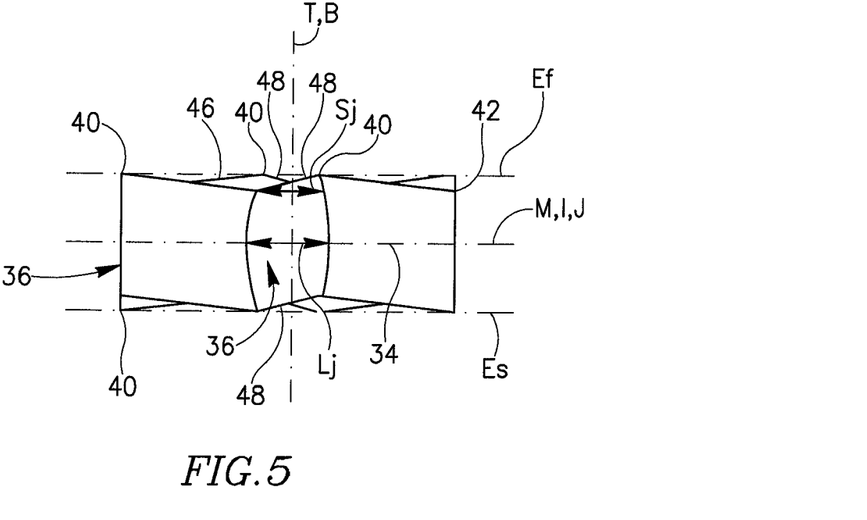
FIG. 5 shows a minor side view of the cutting insert shown in FIG. 2.

The major and minor side surfaces 34, 38 are each intersected by the median plane M to form major and minor median lines $L_I$, $L_J$, respectively. As best shown in FIG. 4, a major side lines $S_I$ lying on the major side surface 34 and extending from the lowered corner 42 parallel to the major median line $L_I$ is longer than the major median line $L_I$. As best shown in FIG. 5, a minor side lines $S_J$ lying on the minor side surface and extending from the lowered corners 42 parallel to the minor median line $L_J$ is shorter than the minor median line $L_J$.

Figure 3:
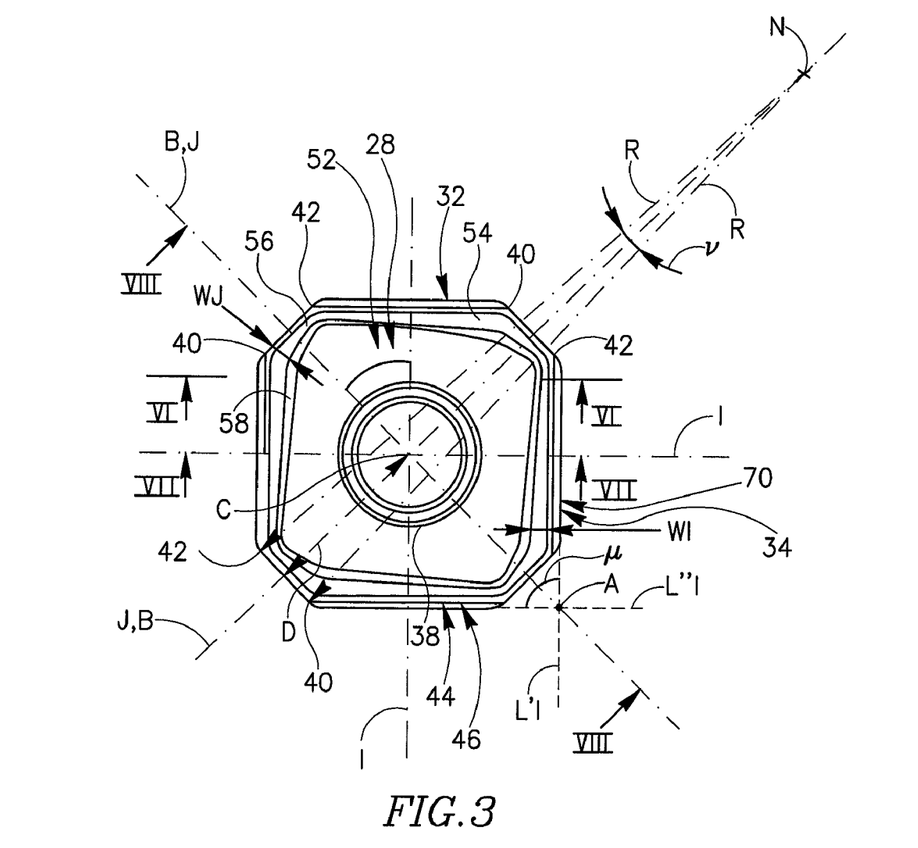
FIG. 3 shows a top view of the cutting insert shown in FIG. 2.

As is best shown in FIG. 3, imaginary extensions of the major median lines $L_I'$, $L_I''$ of two adjacent major side surfaces 34 meet at an apex A to define an internal corner angle $\mu$. The apex A lies on the minor axis J associated with the minor side surface 36 extending between the adjacent major side surfaces 34. In a particular embodiment, the corner angle μ is a right angle. A bisector plane B passes through the through-bore axis T and the respective minor axis J extending perpendicularly to the median plane M to bisect the corner angle μ.

Each minor side surface 36 is a section of a single cylindrical surface extending transversely to the median plane M. Each minor side surface 36 has a minor surface radius R extending thereto from an associated minor surface axis N lying in the associated bisector plane B parallel to the through-bore axis T. The minor side surface 36 intersects the associated minor axis J at a minor surface distance D from the insert center C. Generally, the minor surface radius R is two to twelve times as large as the minor surface distance D and more preferably is between three to six times as large. In the particular embodiment shown, the minor surface radius R is approximately four times greater than the minor surface distance D. The minor side surfaces do not all have to conform to the same cylindrical surface. The minor side surface 36 subtends an acute minor central angle ν, preferably of less than 15°. In a non-binding example, the minor central angle ν is approximately 4° 30'.

The first and second end faces 28, 30 each intersect the peripheral side surface 32 at a peripheral edge 44. The peripheral edges 44 have each four major edges 46 associated with the adjacent major side surface 34, and four minor edges 48 associated with the adjacent minor side surface. In the embodiment shown, a given major edge 46 extends between given lowered corner 42 and given raised corner 40, and a given minor edge extends between given raised corner 40 and given lowered corner 42. Each of the major and minor edges 46, 48 may constitute major and minor cutting edges, respectively. The particular embodiment has four major cutting edges and four minor cutting edges associated with each of the first and second end faces 28, 30, for a total of eight major and eight minor cutting edges.

The first and second end faces 28, 30 have each a peripheral rake surface 50 extending in an inward direction of the cutting insert from the respective peripheral edge 44 towards an end abutment surface 52. The end abutment surfaces 52 may be generally flat, and substantially parallel to each other and to the median plane M. In an end view of the cutting insert, the end abutment surfaces 52 has a general form of a square having beveled corners, which is rotated relatively to the respective end face 28, 30. The peripheral rake surfaces 50 comprise each four major rake surfaces 54 associated with the major edges 46 and four minor rake surfaces 56 associated with the minor edges 48. The major and minor rake surfaces 54, 56 have major and minor rake widths $W_I$, $W_J$, respectively, defined in directions transverse to the associated major and minor edges 46, 48, respectively. The major rake width $W_I$ increases from a minimal major rake width adjacent the lowered corner 42 to a maximal major rake width adjacent the raised corner 40 of the respective major edge 46, while the minor rake width $W_J$ decreases from a maximal minor rake width adjacent the raised corner 40 to a minimal minor rake width adjacent the lowered corner 42 of the respective minor edge 48.

Peripheral rake steps 58 are formed between the peripheral rake surfaces 50 and the respective end abutment surface 52. The rake step 58 extends from the end abutment surface 52 transversely to the median plane M to a step height $H_S$ (see FIG. 6). The step height $H_S$ increases gradually from a minimal step height adjacent the lowered corner 42 to a maximal step height adjacent the raised corner 40. In the particular embodiment, the minimal step height is zero.

Figure 6:
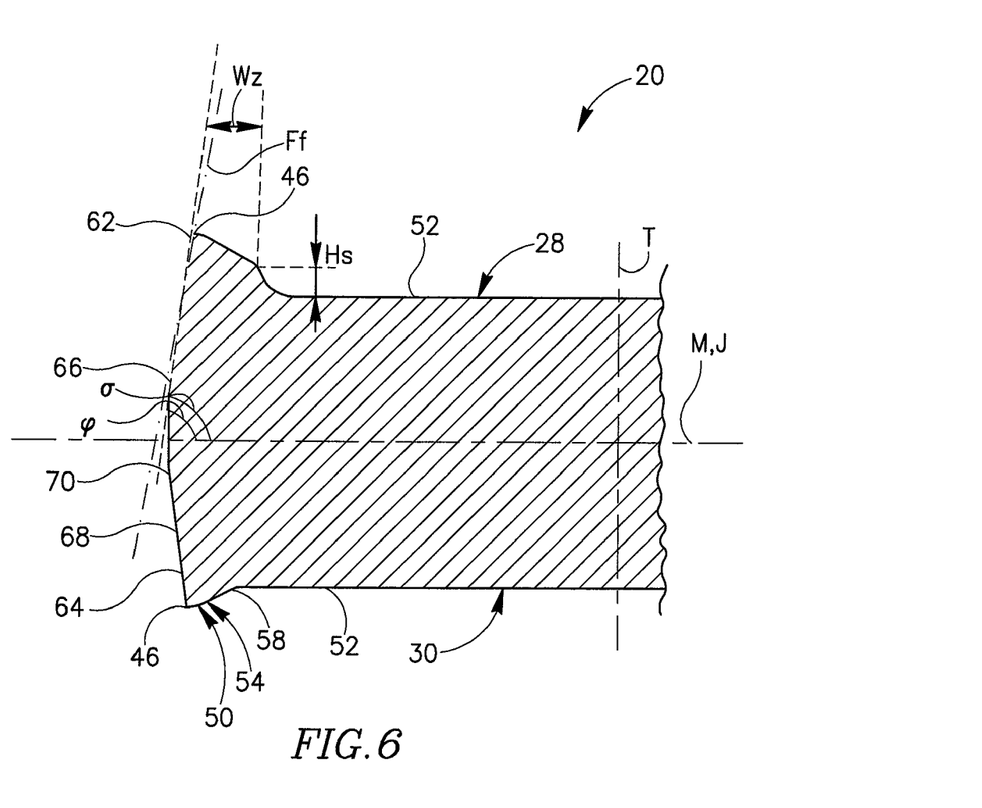
FIG. 6 shows a section view of the cutting insert, taken along the line VI-VI in FIG. 2.

As seen in FIG. 6, the major side surfaces 34 comprise each first and second primary relief surfaces 62, 64 adjacent each of the first and second end surfaces 28, 30, respectively. Each of the first and second primary relief surfaces 62, 64 extends from the adjacent major edge 46 towards the major median line $L_I$. First and second side abutment surfaces 66, 68 extend along each major side surface 34 away from the first and second primary relief surfaces 62, 64, respectively, towards a substantially planar side median surface 70 extending therebetween generally perpendicularly to the median plane M.

Figure 7:
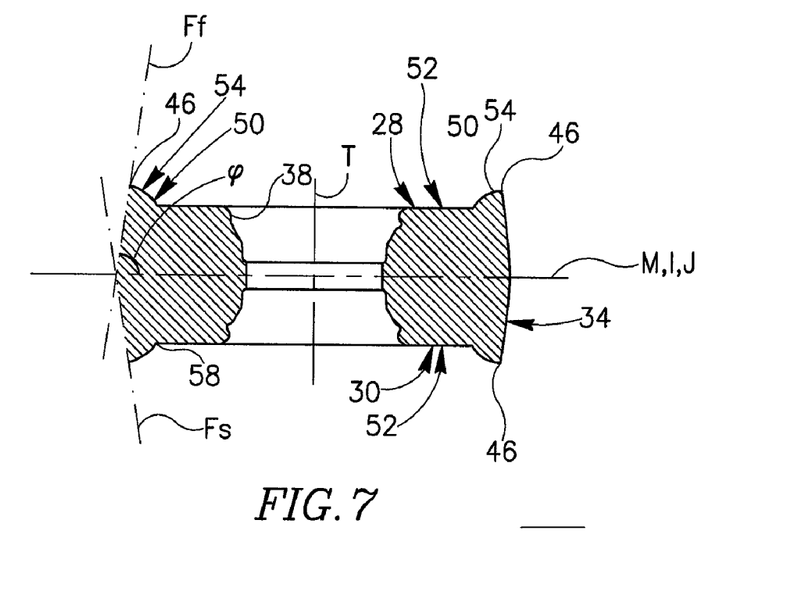
FIG. 7 shows a section view of the cutting insert, taken along the line VII-VII in FIG. 2.
Figure 8:
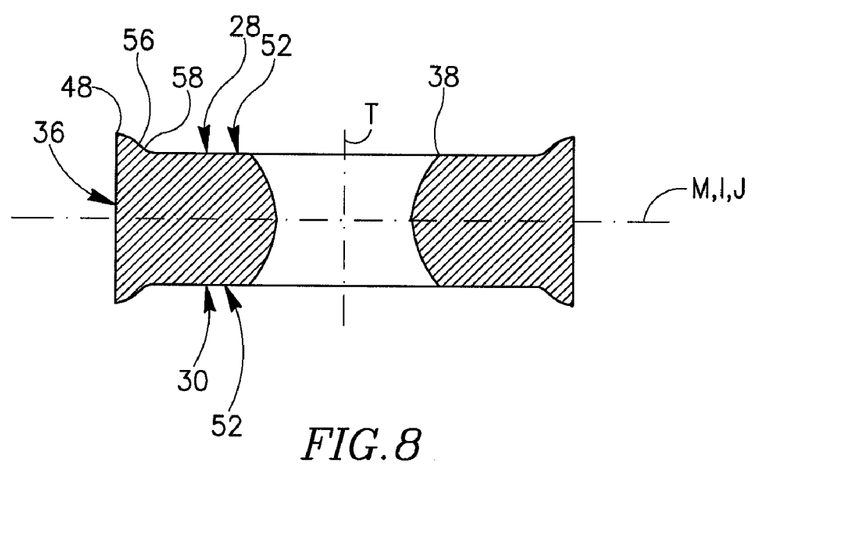
FIG. 8 shows a section view of the cutting insert, taken along the line VIII-VIII in FIG. 2.
Figure 9:
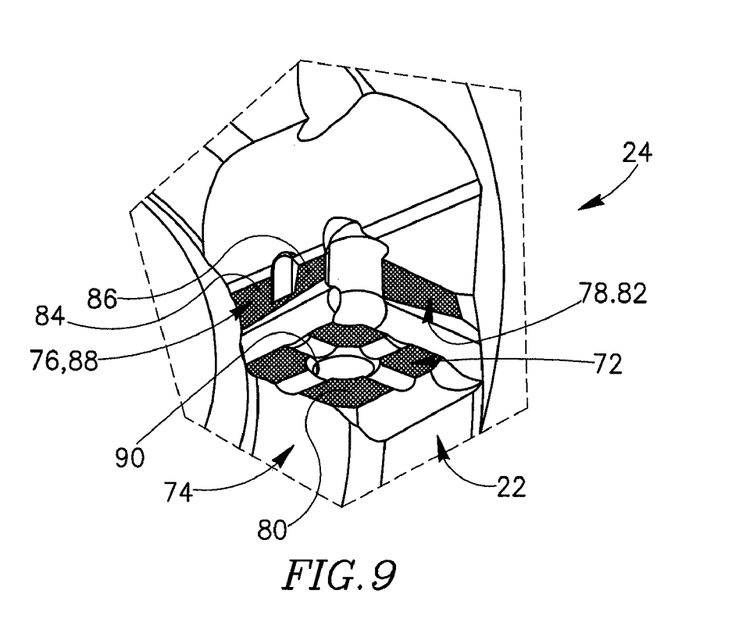
FIG. 9 shows a perspective view of an insert pocket of the milling cutter shown in FIG. 1.
Figure 10:
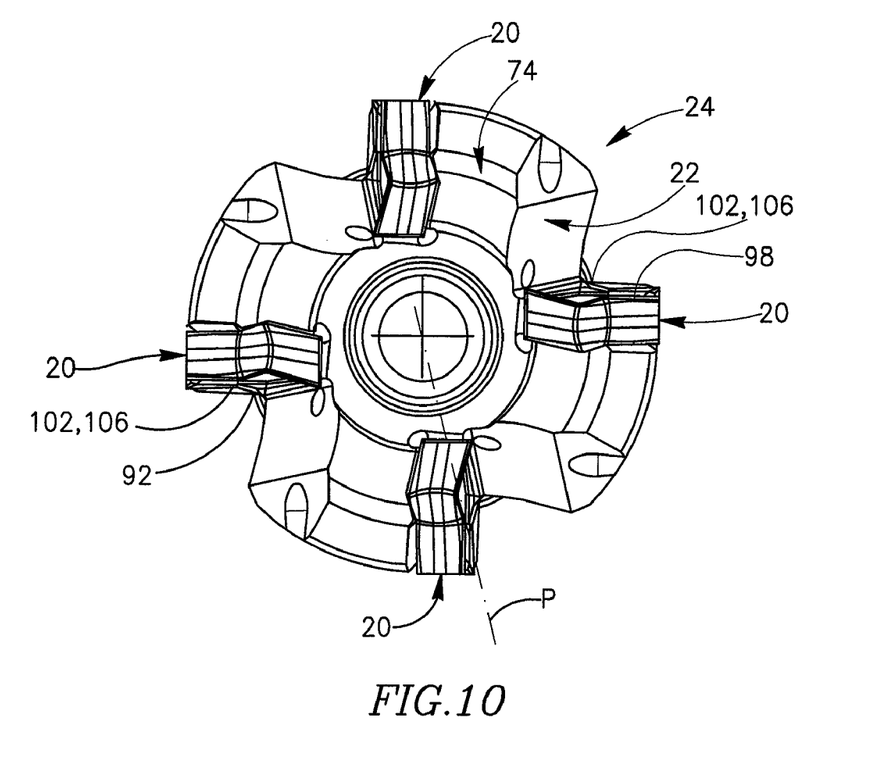
FIG. 10 shows a front view of the of the milling cutter shown in FIG. 1.
Figure 11:
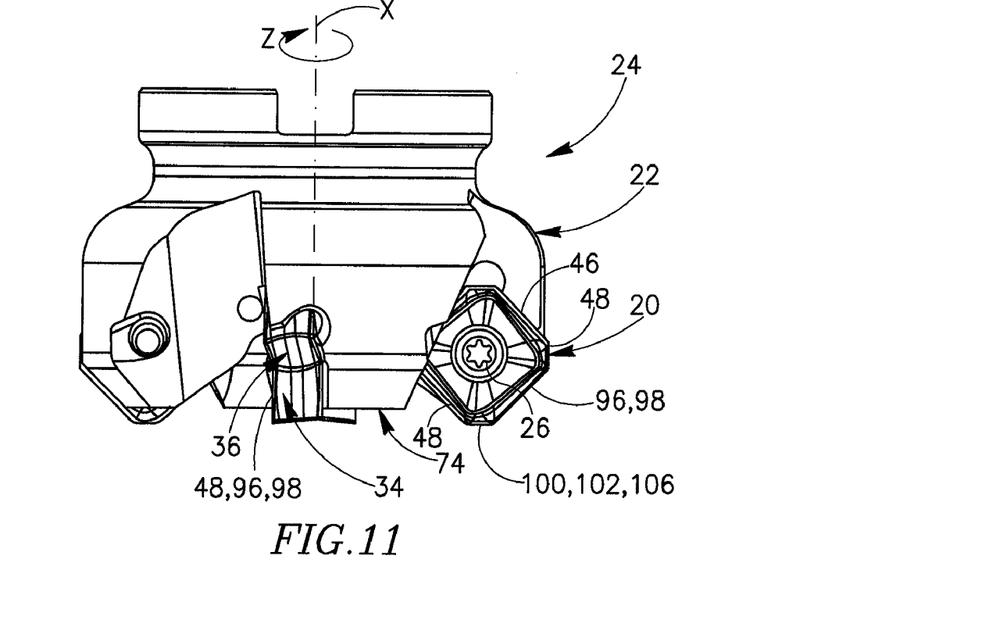
FIG. 11 shows a front view of the of the milling cutter shown in FIG. 1.
Figure 12:
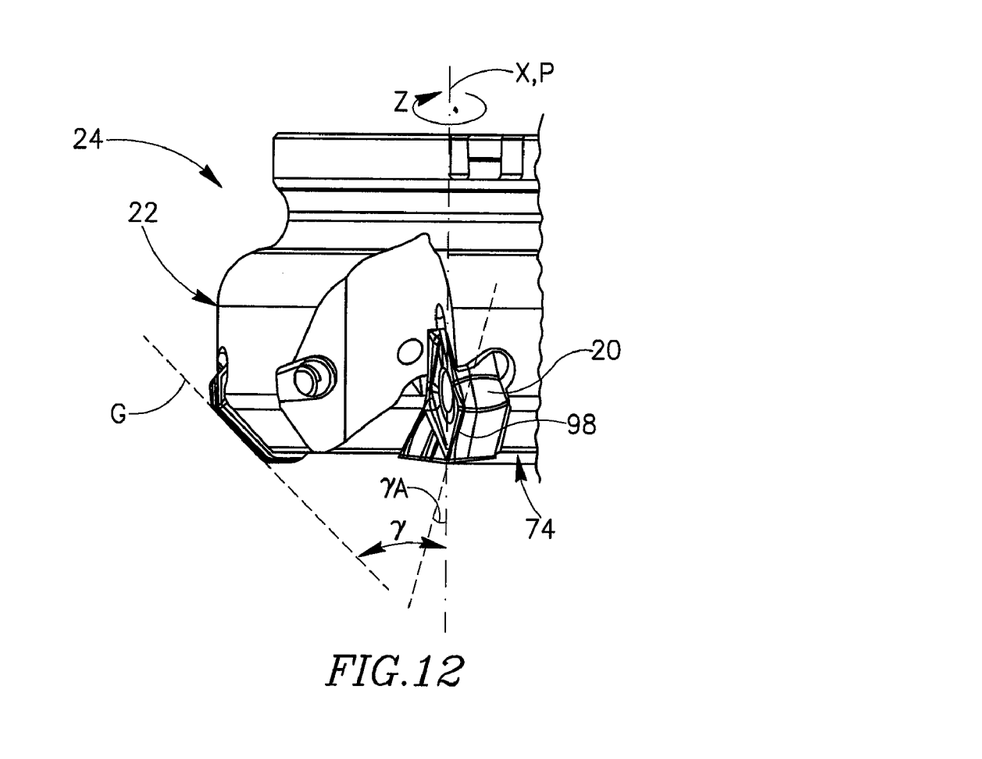
FIG. 12 shows a radial side view of the of the milling cutter shown in FIG. 1, taken perpendicularly to the radial plane P in FIG. 10.

As seen in FIGS. 6 and 7, in each major cross section of the cutting insert, taken in a plane generally perpendicular to a given major side surface 34, the first and second primary relief surfaces 62, 64 may be straight, or they may be convexly curved. The major rake surfaces 54 may be straight, or they may be concavely curved. First and second primary relief lines $F_F$, $F_S$ tangent to the first and second primary relief surfaces 62, 64, respectively, at the respective major edge 46 form each an acute interior relief angle φ with the median plane M. The relief angle φ may be constant or may vary along the major edge. The variation of the relief angle φ may be in accordance to any desired definition. The first and second side abutment surfaces 66, 68 form each an acute side abutment angle σ with the median plane M. The side abutment angle σ may be generally constant along the major side surface 34, and is generally equal to, or greater than, the relief angle φ. In the particular embodiment, the primary relief angle φ is equal to the side abutment angle σ adjacent the lower corner 42, and decreases along the major edge 46 towards the raised corner 40 in such a way so as to define a helically twisting primary relief surface 62, 64. As is best shown in FIG. 8, in each minor cross section of the cutting insert 20, taken in a plane generally perpendicular to a given minor side surface 36, the minor side surface 36 is perpendicular to the median plane M.

Attention is now drawn to FIGS. 9 to 12. The milling cutter 24 is rotatable about an axis of rotation X defining a front-to-rear direction and a direction of rotation Z, and has four cutting inserts 20 in accordance with the present invention mounted each in an insert pocket 72 provided at a cutter front end 74 of the cutter body 22. It should be noted that directional terms appearing throughout the specification and claims, e.g. "front", "rear", etc., (and derivatives thereof) are for illustrative purposes only, and are not intended to limit the scope of the appended claims. The insert pocket 72 comprises adjacent inner and outer walls 76, 78, generally transverse to a pocket base 80. The outer wall 78 is provided with an outer location surface 82 and the inner wall 76 is provided with spaced apart front and rear location surfaces 84, 86 located on either side of a central recessed region 88 of the inner wall 76. The pocket base 80 is provided with a threaded bore 90 for receiving the clamping screw 26 in order to secure the cutting insert 20 in the insert pocket 72.

When the cutting insert 20 is secured in the insert pocket 72, one of the first and second end faces 28, 30, e.g., the first end face 28, is positioned to face generally tangentially forwardly in the direction of rotation Z of the milling cutter, and constitutes an operative end face 92. The second end face 30 constitutes a supporting end face (not shown), and is positioned with the respective end abutment surface 52 abutting the pocket base 80. A front outer major edge 96 of the operative end face 92 constitutes an operative major cutting edge 98, while a front minor edge 100 of the operative end face 92 constitutes an operative minor cutting edge 102 associated with the operative major cutting edge 98. The first side abutment surface 66 of an inner rear major side surface (not shown), located adjacent the operative end face 92 and opposite the operative major cutting edge 98, abuts the front and rear location surfaces 84, 86. The first side abutment surface 66 of an outer rear major side surface (not shown) located adjacent the operative end face 92 and adjacent the operative major cutting edge 98 abuts the outer location surface 82 of the insert pocket 72.

The cutting insert 20 and the milling cutter 24 shown in the figures may be used to face-mill a work-piece (not shown), machining a 45° shoulder on the work-piece face, and therefore the cutting insert 20 is located in the insert pocket 72 so that, when the milling cutter 24 is rotated about the axis of rotation X, the operative major cutting edge 98 describes a frustoconical envelope having a generator line G forming a generator angle γ of generally 45° with the axis of rotation X. In order to provide a high-quality work-piece face relatively free from machining marks or blemishes, the operative minor cutting edge 102 functions as a wiper edge 106. The wiper edge 106 is adapted to machine a substantially flat face on the work-piece at 90° to the axis of rotation X of the milling cutter 24. The operative major cutting edge 98 forms a positive major axial rake angle γA with a radial plane P passing through a raised corner 40 thereof and through the axis of rotation X of the milling cutter 24 (best shown in FIG. 12).

The cutting insert 20 shown in the figures may be indexed in the insert pocket 72 about its through-hole axis T in four steps of 90°, each indexing step positioning a fresh major edge 46 as the operative major cutting edge 98. The cutting insert 20 may additionally be reversed so that the first end face 28 may become the supportive end face (not shown) and the second end face 30 may become the operative end face 92, providing four additional fresh major edges 46 which can be indexed to the position of the operative major cutting edge 98. Generally, each of the major and minor edges 46, 48 constitutes "full effective" cutting edges, i.e., the entire extent of each of the major and minor edges is capable of performing machining operations in a given position of the cutting insert 20.

The cutting insert 20 in accordance with the present invention is preferably manufactured by form-pressing or injection molding and sintering of metallurgical, ceramic or cermet powders. The peripheral side surface 32 of the cutting insert 20 may be ground to increase positioning accuracy thereof in the insert pocket 72, which may be desirable in milling a smooth, high-quality face of the work-piece. However, in accordance with the present invention, it may not be necessary to grind the peripheral side surfaces 32 while maintaining desired smoothness and quality of the milled face of the work-piece.

Figure 13:
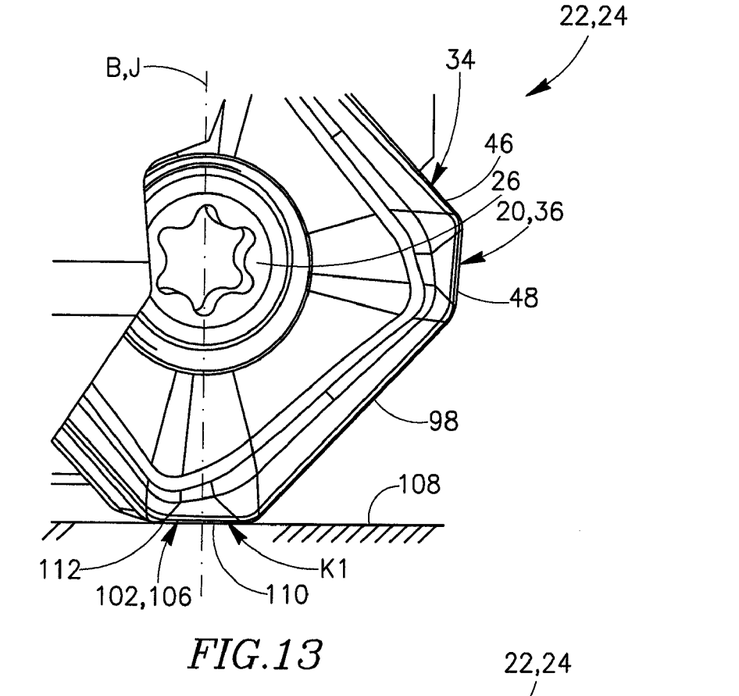
FIG. 13 shows a detail view showing a wiper edge of the cutting insert mounted in a correct position in the insert pocket of the cutter tool shown in FIG. 11.
Figure 14:
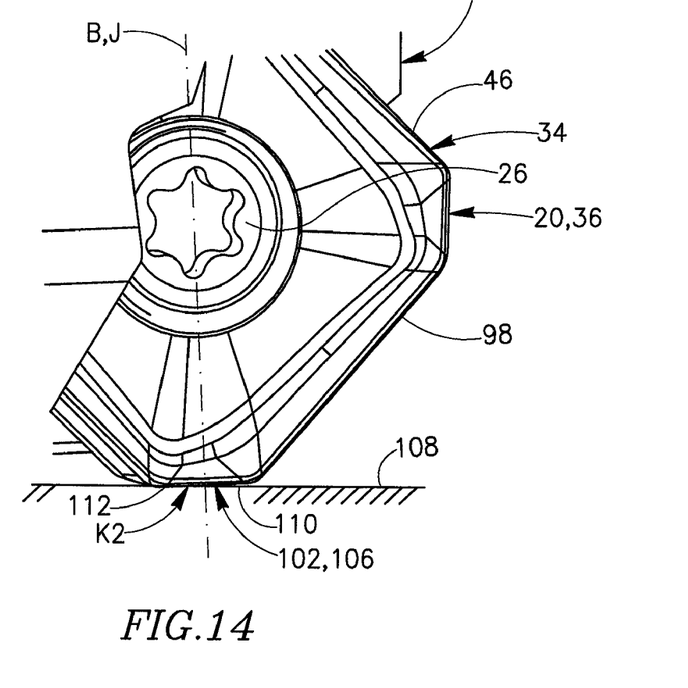
FIG. 14 shows a detail view of the wiper edge of the cutting insert shown in FIG. 13, mounted in a deviated position.

Attention is directed to FIGS. 13 and 14, showing the cutting insert in accordance with the present invention machining the work-piece face 108 while being secured in the milling cutter in a correct position (FIG. 13) and in a deviated position (FIG. 14). In the correct position (FIG. 13), the wiper edge 106 of the cutting insert machines the work-piece face 108 at a first wiping region K1 located on a first wiper portion 110 extending between the bisector plane B and the associated operative major cutting edge 98. However, even when mounted in the deviated position (FIG. 14), the wiper edge 106 still machines the work-piece face 108, albeit at a second wiping region K2 located on a second wiper portion 112 extending from the bisector plane B away from the operative major cutting edge 98.

Although the present invention has been described to a certain degree of particularity, it should be understood that various alterations and modifications could be made without departing from the spirit or scope of the invention as hereinafter claimed.

What is claimed is:

1. A double-sided reversible and indexable cutting insert comprising:
   identical opposing first and second end faces;
   a peripheral side surface extending between said first and second end faces, the peripheral side surface comprising Y major side surfaces and Y minor side surfaces, Y being an integer number, each minor side surface interconnecting two adjacent major side surfaces;
   a median plane (M) located between, and spaced apart from, the first and second end faces and containing an insert center (C); and
   an insert axis (T) extending perpendicularly through the median plane and passing through said insert center (C); wherein:
   each minor side surface is a section of a single cylindrical surface having a radius (R), the radius (R) being greater than a minor side surface distance (D) between said each minor side surface and the insert axis T.

2. The cutting insert of claim 1, wherein each minor side surface has an associated minor surface axis (N) extending parallel to the insert axis (T).

3. The cutting insert of claim 1, wherein the radius (R) is between two and twelve times as large as the minor side surface distance (D).

4. The cutting insert of claim 3, wherein the radius (R) is between three and six times as large as the minor side surface distance (D).

5. The cutting insert of claim 1, wherein in an end view of the cutting insert, the minor side surface subtends a minor central angle of less than 15°.

6. The cutting insert of claim 5, wherein the minor central angle is less than 5°.

7. The cutting insert of claim 1, wherein:
   the peripheral side surface meets each of the first and second end faces at a peripheral edge;
   each peripheral edge comprises Y major edges and Y minor edges;
   each major edge is formed at an intersection of an associated major side surface and a respective one of the first and second end faces; and
   each minor edge is formed at an intersection of an associated minor side surface and a respective one of the first and second end faces, and interconnects two adjacent major edges.

8. The cutting insert of claim 7, wherein:
   each minor edge extends between a raised corner formed at a meeting of the minor edge with a preceding major edge, and a lowered corner formed at a meeting of the minor edge with a following major edge; and
   the raised corner is disposed farther from the median plane M than the lowered corner.

9. The cutting insert of claim 1, wherein:
   each minor side surface has 180° rotational symmetry around a minor axis (J) that passes perpendicularly through said each minor side surface; and
   the insert axis (T) and the minor axis (J) define a bisector plane (B) which bisects said each minor side surface.

10. The cutting insert of claim 9, wherein two adjacent major median lines formed at intersections of the median plane with each of two adjacent major side surfaces, respectively, meet at an apex located on the minor axis (J) of the minor side surface interconnecting the two adjacent major side surfaces.

11. The cutting insert of claim 10, wherein each major median line is a straight line.

12. The cutting insert of claim 11, wherein the minor axis bisects an internal major angle defined by the two straight, adjacent major median lines.

13. The cutting insert of claim 1, wherein each major side surface comprises a median surface extending in opposite directions away from a major median line formed at an intersection of the median plane with that major surface, towards first and second major edges formed at the intersection of that major surface with respective first and second end faces.

14. The cutting insert of claim 13, wherein said each major side surface comprises first and second support surfaces extending from the median surface towards the first and second major edges, respectively.

15. The cutting insert of claim 14, wherein said each major side surface comprises first and second primary relief surfaces extending from said first and second major edges towards the first and second support surfaces, respectively.

16. The cutting insert of claim 15, wherein:
the first and second support surfaces each form an acute internal support angle with the median plane;
the first and second primary relief surfaces each form an acute internal relief angle with the median plane; and
the internal support angle is equal to, or greater than, the internal relief angle.

17. The cutting insert of claim 15, wherein:
each end face has Y raised corners and Y lowered corners, the lowered corners being closer to the median plane than the raised corners;
each major edge extends between a lowered corner and a raised corner;
the first and second primary relief surfaces each form an acute internal relief angle with the median plane; and
the internal relief angle is largest adjacent the lowered corner and smallest adjacent the raised corner of said each major edge.

18. The cutting insert of claim 1, wherein the minor side surface is perpendicular to the median plane.

19. The cutting insert of claim 1, wherein:
each end face has Y raised corners and Y lowered corners, the lowered corners being closer to the median plane than the raised corners;
each major side surface intersects the first and second end faces to form first and second major edges, respectively;
each major edge extends between a lowered corner and a raised corner;
said each major side surface has a major median line formed at an intersection of the median plane with that major side surface; and
in a major side view of the cutting insert, a major side line parallel to the major median line and passing through the lowered corner is longer than the major median line.

20. The cutting insert of claim 19, wherein
each minor side surface intersects the first and second end faces to form first and second minor edges, respectively;
each minor edge extends between a raised corner and a lowered corner;
said each minor side surface has a minor median line formed at an intersection of the median plane with that minor side surface; and
in a minor side view of the cutting insert, a minor side line parallel to the minor median line and passing through the lowered corner is shorter than the minor median line.

21. The cutting insert of claim 1, wherein
each end face has Y raised corners and Y lowered corners, the lowered corners being closer to the median plane than the raised corners;
each minor side surface intersects the first and second end faces to form first and second minor edges, respectively;
each minor edge extends between a raised corner and a lowered corner;
said each minor side surface has a minor median line formed at an intersection of the median plane with that minor side surface; and
in a minor side view of the cutting insert, a minor side line parallel to the minor median line and passing through the lowered corner is shorter than the minor median line.

22. The cutting insert of claim 1, further comprising:
a clamping through-bore extending between, and opening out to, the first and second end faces, the insert axis (T) serving as a through bore axis.

23. The cutting insert of claim 1, wherein the cutting insert has Y-fold rotational symmetry about the insert axis (T).

* * * * *

UNITED STATES PATENT AND TRADEMARK OFFICE
CERTIFICATE OF CORRECTION

| | | |
|---|---|---|
| PATENT NO. | : 7,419,338 B2 | Page 1 of 1 |
| APPLICATION NO. | : 11/751888 | |
| DATED | : September 2, 2008 | |
| INVENTOR(S) | : Carol Smilovici et al. | |

It is certified that error appears in the above-identified patent and that said Letters Patent is hereby corrected as shown below:

Title page
After the section entitled, "Related U.S. Application Data", kindly insert the following:

Item --(30) Foreign Application Priority Data

June 30, 2005 (IL)......................................169491--.

Signed and Sealed this

Fourth Day of November, 2008

JON W. DUDAS
*Director of the United States Patent and Trademark Office*